(12) United States Patent
Georgiev

(10) Patent No.: US 6,268,846 B1
(45) Date of Patent: Jul. 31, 2001

(54) 3D GRAPHICS BASED ON IMAGES AND MORPHING

(75) Inventor: Todor Georgiev, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/102,729

(22) Filed: Jun. 22, 1998

(51) Int. Cl.[7] .................................................. G09G 5/10
(52) U.S. Cl. ........................ 345/138; 382/285; 382/308
(58) Field of Search .................................... 345/419, 138, 345/420, 426; 382/285, 308

(56) References Cited

U.S. PATENT DOCUMENTS

| | | | |
|---|---|---|---|
| 5,598,515 | * | 1/1997 | Shashua ................................ 345/422 |
| 5,764,231 | * | 6/1998 | Ray et al. ............................. 345/419 |
| 5,959,718 | * | 9/1999 | Morton .................................. 355/22 |
| 6,064,399 | * | 5/2000 | Teo ....................................... 345/435 |

OTHER PUBLICATIONS

Seungyong Lee et al., "Polymorph: Morphing Among Multiple Images," *IEEE*, 60–73, 1998.
Todor Georgiev, "Movie Compression and Motion Editing by Multi–Image Morphing," 20 pgs. 1997.
Jain et al., "Algorithms for Clustering Data," *Prentice Hall*, Englewood Cliffs, NJ, 24–36, 1988.
Turk et al., "Eigenfaces for Recognition," Massachusetts Institute of Technology, *Journal of Cognitive Neuroscience* vol.3, No.1, 72–86, 1991.
Devijver et al., "Pattern Recognition: a Statistical Approach," *Prentice Hall International*, 301–341, 1982.
George Wolberg, "Digital Image Warping," *IEEE Computer Society*, 41–65, 1990.
Klaus et al., "Robot Vision," The MIT Electrical Engineering and Computer Science Series, 279–95, 1986.

Johnson et al., "Applied Multivariate Statistical Analysis," University of Wisconsin–Madison, *Prentice–Hall, Inc.*, 361–388, 1982.
Beymer et al., "Example Based Image Analysis and Synthesis," *Massachusetts Institute of Technology Artificial Intelligence Laboratory*, Memo No. 1431, Paper No.80, 21 pgs., Nov. 1993.

(List continued on next page.)

*Primary Examiner*—Mark Zimmerman
*Assistant Examiner*—Lance W. Sealey
(74) *Attorney, Agent, or Firm*—Fish & Richardson P.C.

(57) ABSTRACT

A computer-implemented method generates a new view of a three-dimensional scene by receiving three or more pictures representing three or more different view points on a plane, each picture taken from a viewing direction perpendicular to the plane; selecting a new point on the plane; and generating the new view of the three dimensional scene from the new point by morphing among the three or more pictures. In another aspect, the method may also generate the new view by receiving two or more pictures from two or more view points located on a line along the direction of view; projecting the two or more pictures onto a cylinder; performing a multi-image morph on the images projected on the cylinder; and projecting the result of the multi-image morph to generate the new view of the three dimensional scene. In yet another aspect, the method can also generate the new view by receiving three or more images representing three or more different view points on a first plane, each image taken from a viewing direction perpendicular to the first plane; receiving three or more images from three or more different view points on a second plane, each image taken from a viewing direction perpendicular to the second plane, the first plane being parallel to the second plane; and generating the new view of the three dimensional scene from an arbitrary point in three dimensional space by morphing among the six or more images. More than two parallel planes can be used with a similar setting.

35 Claims, 6 Drawing Sheets

OTHER PUBLICATIONS

Wolberg, "Motion Field & Optical Flow," Motion Field 12, 279–295, 1990.

T.Georgiev et al., "Morphing Between Multiple Images," S.Illinois Univ. at Cardbondale dept. of Comp. Science, Technical Report, pp. 17, Apr. 17, 1997.

T.Georgiev, "Morphing Between Multiple Images: Theory and Applications," Thesis, S.Illinois Univ. at Cardbondale Dept. of Comp. Science, pp. 45, 6/1977.

S.M. Seitz et al., "View Morphing," Department of Computer Sciences Univ. of Wisconsin, in Proc. SIGGRAPH 96, 10.pgs.

B. Horn, Robot Vision, "Motion Field & Optical Flow," MIT Press, Cambridge, Massachussetts, 1986, pp. 278–295.

Wolberg, "Spatial Transformations," IEEE Computer Society Press, Los Alamitos, 1990, pp. 41–65.

* cited by examiner

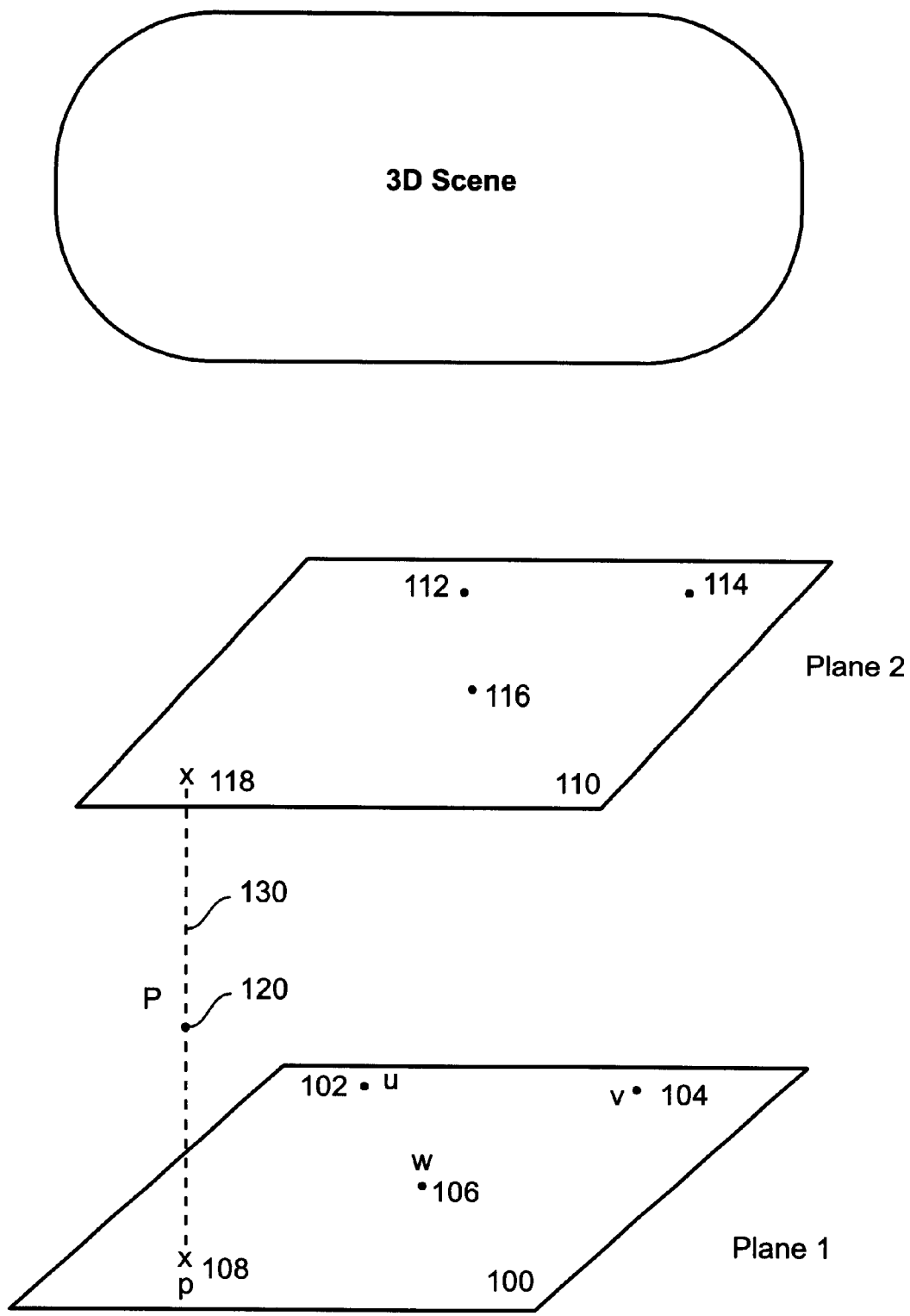
FIG._1

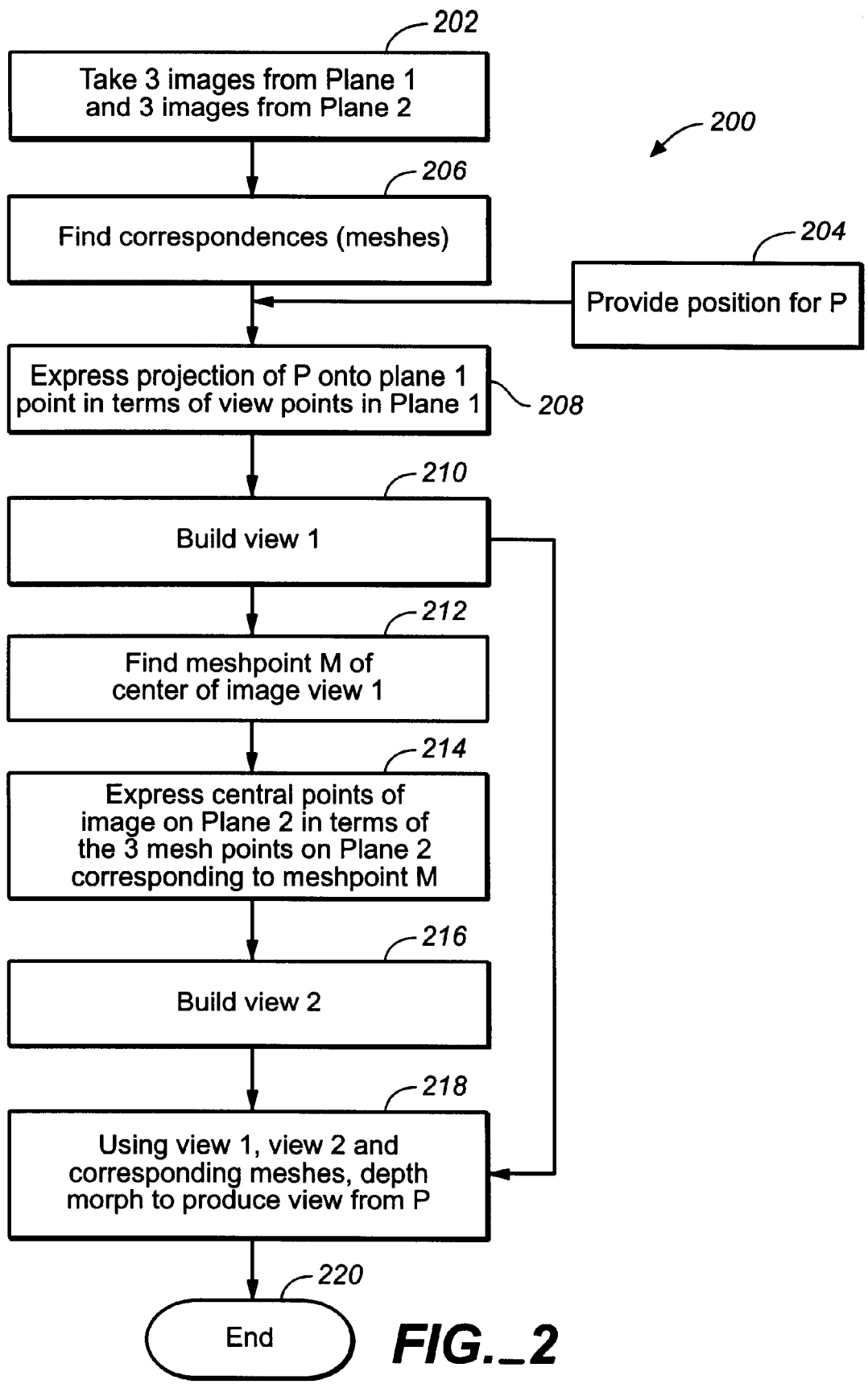
FIG._2

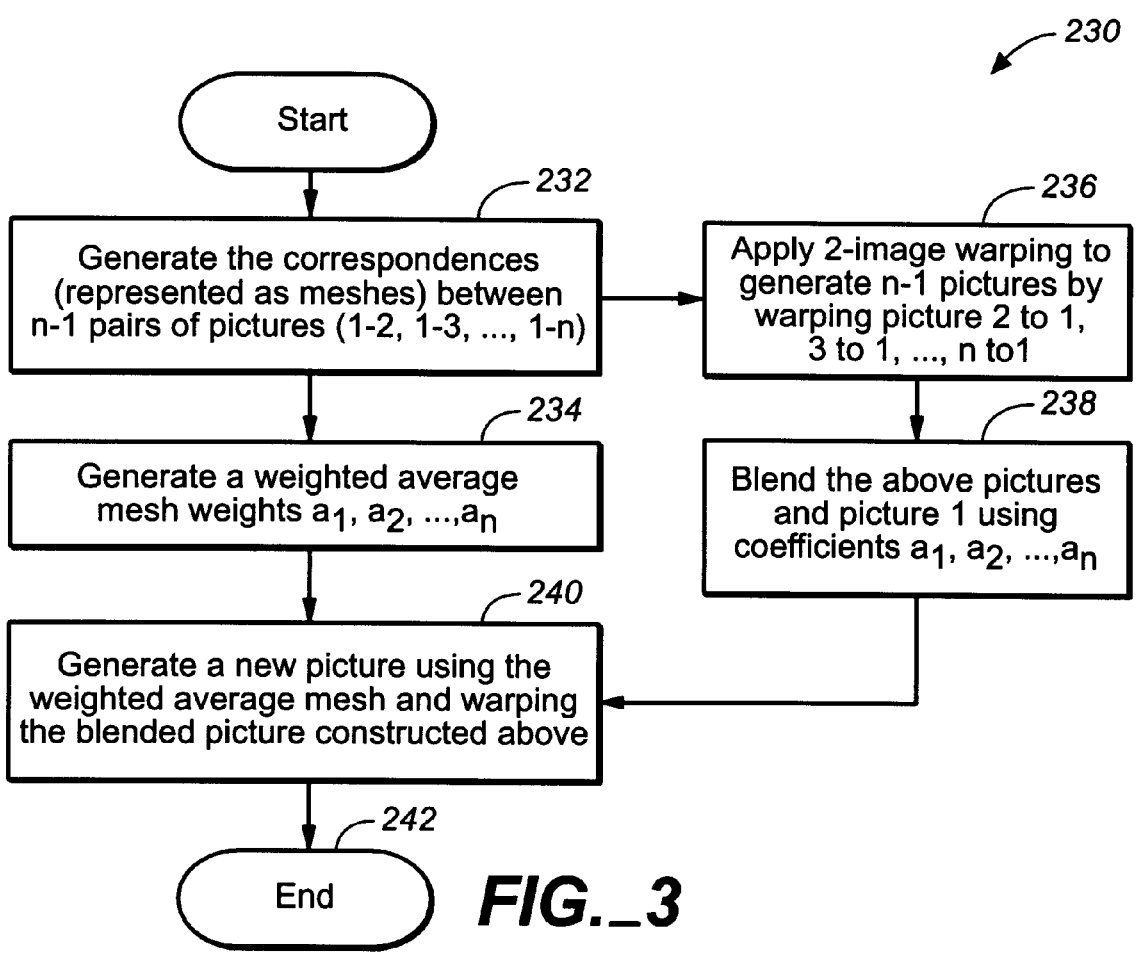
FIG._3

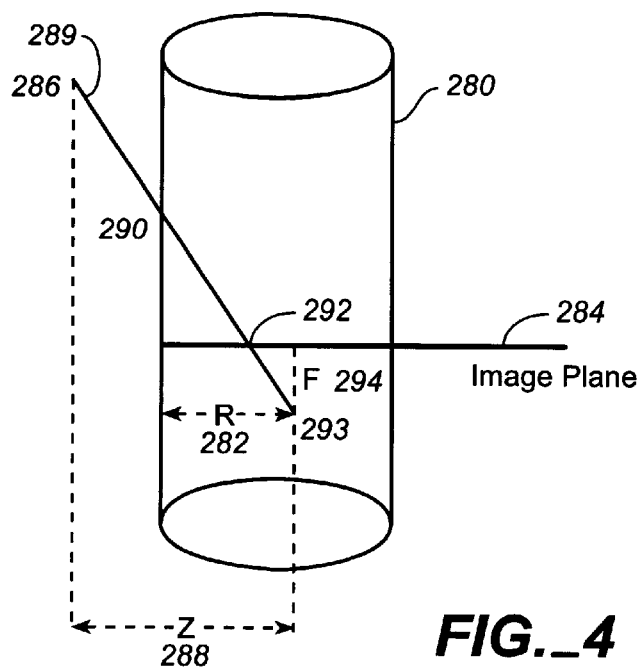
FIG._4
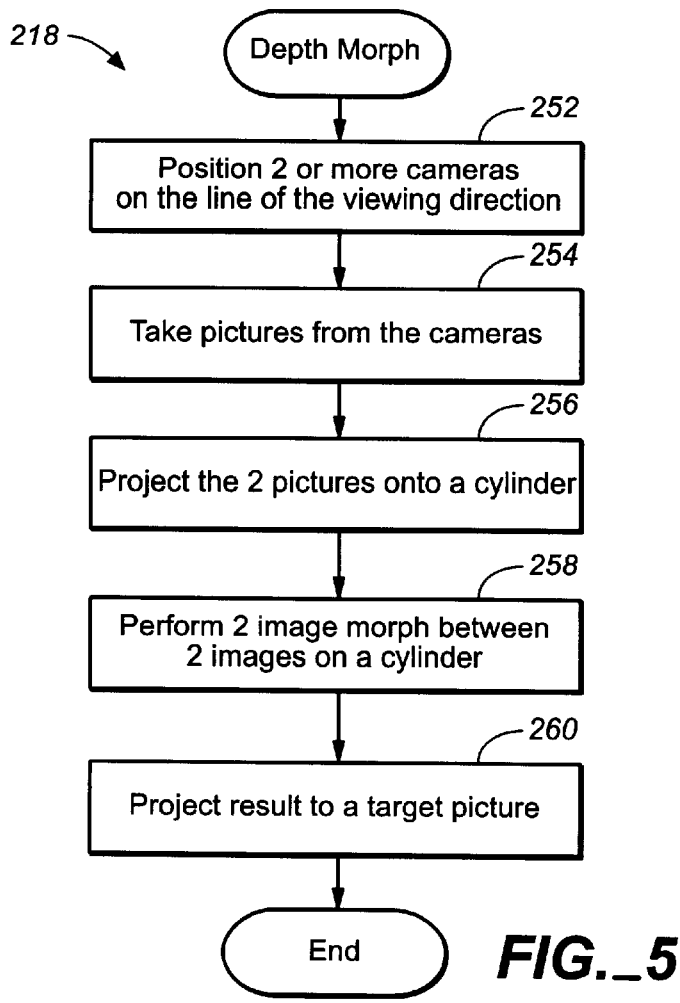
FIG._5

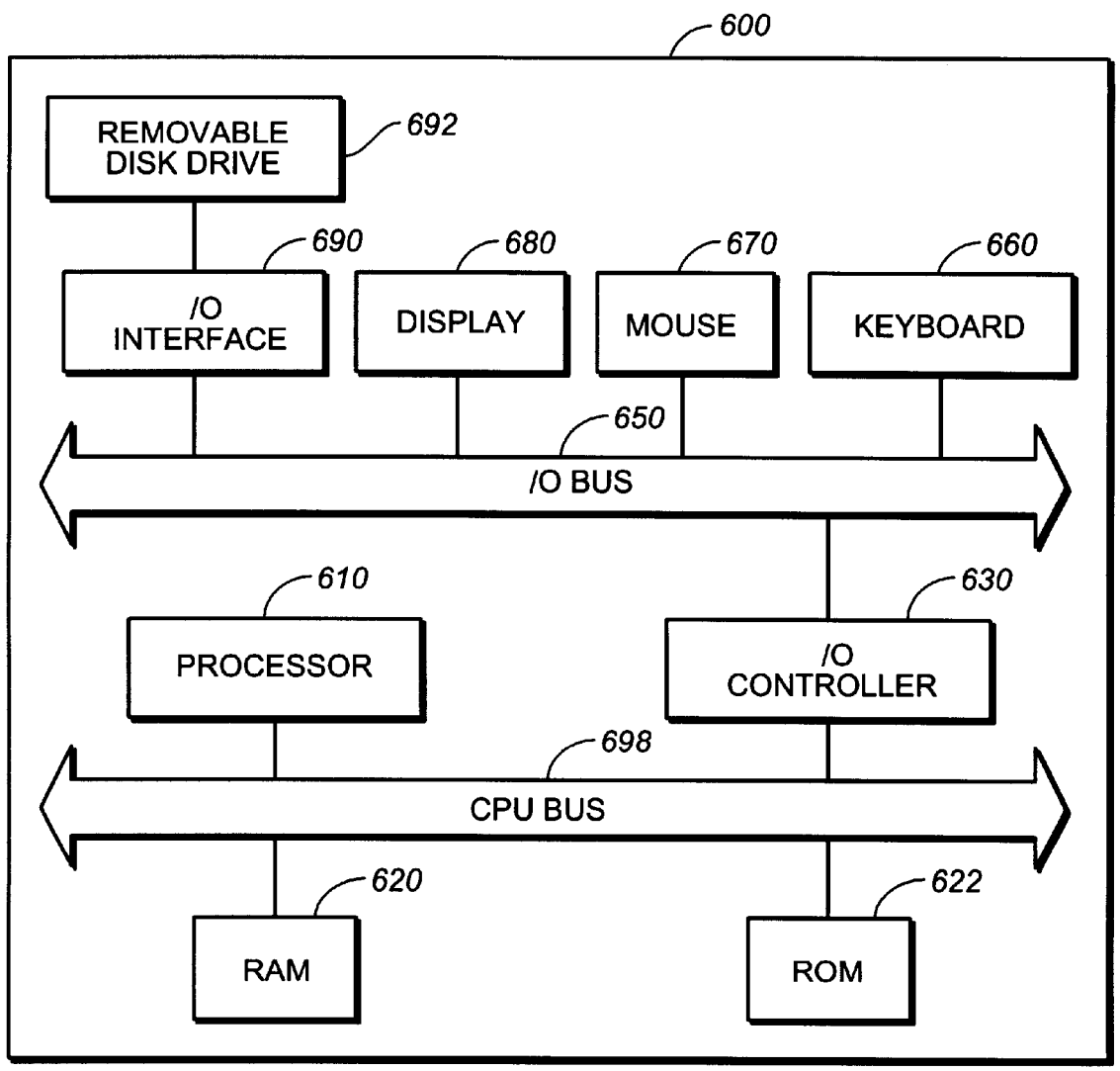
FIG._6

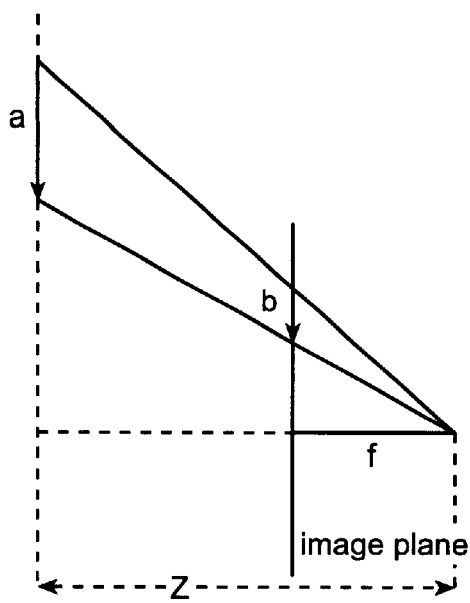
FIG._7
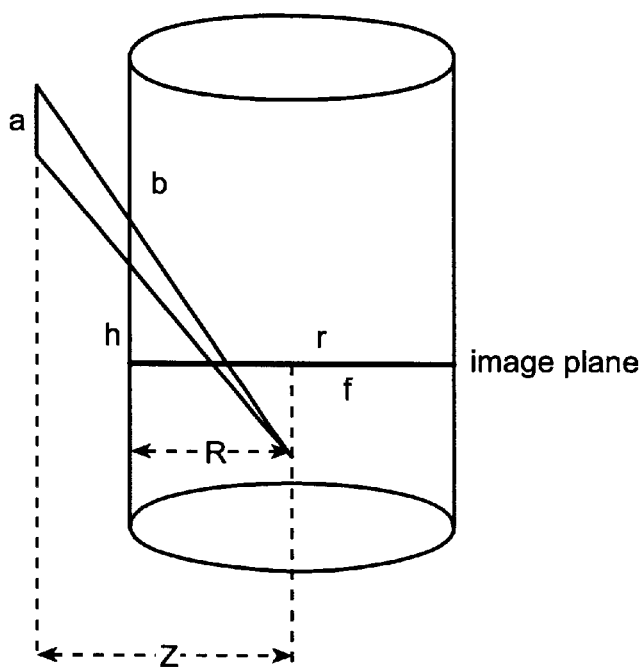
FIG._8

3D GRAPHICS BASED ON IMAGES AND MORPHING

BACKGROUND

The present invention relates to the fields of computer graphics and image manipulation. More particularly, the invention relates to techniques for generating three dimensional (3D) graphics directly from images, without constructing a 3D model explicitly.

Conventionally, a 3D modeling and rendering process is used for representing different views of a 3D scene. The usual steps in constructing a 3D model include: loading an image or previous saved work; displaying the image; identifying one or more object features in the image; finding the object features in 3D space; displaying a model of object features in 3D space; measuring lengths, distances and angles of the objects; and saving the work. These steps can be repeated until satisfactory results are obtained. This process requires a great deal of user interaction and is time-consuming. The user has to construct detailed models (e.g., polygon or wire frame) of the objects appearing in an image.

Once 3D models are obtained, the models may be animated by varying them and displaying the varied models at a predetermined frame rate. However, it is difficult to manipulate computer graphics representations of three-dimensional models, for example to rotate the object or "fly through" a scene. If many objects need to be displayed, or many surface textures need to be filled, the time required to compute new views can be prohibitive. The conventional 3D rendering process is thus compute intensive and also the rendering time depends on the complexity of the visible part of the scene.

On another note, one type of special effect in computer graphics is known as morphing. The morphing operation changes one picture to another by creating a smooth transitional link between the two pictures. The process preserves features associated with each image by mapping the features from a source image to corresponding features in a destination image. Morphing couples image warping with color interpolation. Image warping applies two dimensional geometric transformations on images to align their features geometrically, while color interpolation blends their colors. In this way, a seamless transition from one picture to another is achieved.

It can be expected that morphing between two views may be used to generate an effect of moving a camera while taking a movie. Distortions in the geometry of the images generated by morphing often arise when morphing is used to generate the effect of moving a camera. In a method known as view morphing, two parallel views taken by two cameras are interpolated and a special geometry is designed so that the distortions are eliminated. Any view from a point on the line connecting the two view points can be synthesized. However, the view morphing method cannot synthesize a view from any point in 3D space and can only synthesize views on a line connecting the two cameras.

SUMMARY

A computer-implemented method generates a new view of a three-dimensional scene by receiving three or more pictures representing three or more different view points on a plane, each picture taken from a viewing direction perpendicular to the plane; selecting a new point on the plane; and generating the new view of the three dimensional scene from the new point by morphing among the three or more pictures.

In another aspect, the method may also generate the new view by receiving two or more pictures from two or more view points located on a line along the direction of view; projecting the two or more pictures onto a cylinder; performing a multi-image morph on the images projected on the cylinder; and projecting the result of the multi-image morph to generate the new view of the three dimensional scene.

In yet another aspect, the method can also generate the new view by receiving three or more images representing three or more different view points on a first plane, each image taken from a viewing direction perpendicular to the first plane; receiving three or more images from three or more different view points on a second plane, each image taken from a viewing direction perpendicular to the second plane, the first plane being parallel to the second plane; and generating the new view of the three dimensional scene from an arbitrary point in three dimensional space by morphing among the six or more images. More than two parallel planes can be used with a similar setting.

In another aspect, the method can synthesize the view after changing the lighting of a three dimensional scene from a first light source to a second light source by creating views of the three dimensional scene from viewpoints of the first light source and the second light source, respectively; determining a mesh associated with the view of the three dimensional scene from the first light source; determining a mesh associated with the view of the three dimensional scene from the second light source; determining the amount of light based on the ratio of the areas of pairs of corresponding quadrilaterals in the meshes; and generating the new view of the three dimensional scene with the determined lighting. The input pictures are taken with the first light source.

Implementations of each of the above aspect may include the following. The picture may be taken using a virtual camera, including a physical camera or a computer image generator. Further, one virtual camera is positioned at each view point, or alternatively, all images may be taken by one virtual camera sequentially from each view point. Additionally, a movie may be generated by generating a sequence of views from a sequence of new points.

Advantages of the invention include the following. The invention permits the user to generate any desired 3D view, if provided with a small number of appropriately chosen starting images. The invention avoids the need for 3D shape modeling. System performance is enhanced because the morphing process requires less memory space, disk space and processing power than the 3D shape modeling process. The need for 3D modeling, which is not only time-consuming, but is also practically impossible in certain cases such as modeling hair or trees, is obviated.

Further, rendering speed is independent of the complexity of the scene. Also, the resulting 3D images are strikingly lifelike and visually convincing because they are derived from images and not from geometric models. The multi-image morphing process correctly simulates effects of specular reflectivity. The invention thus provides a powerful and lasting impression, engages audiences and creates a sense of reality and credibility.

BRIEF DESCRIPTION OF THE DRAWINGS

FIG. 1 is a diagram illustrating positions of view points (camera positions) in accordance with the present invention.

FIG. 2 is a flow chart of a process for generating a view of a three dimensional scene in accordance with the invention.

FIG. 3 is a flow chart of a process for morphing among multiple images using meshes.

FIG. 4 is a diagram representing projecting an image onto a cylinder.

FIG. 5 is a flow chart of a process for depth-morphing in accordance with the invention.

FIG. 6 is a diagram of a computer system.

FIG. 7 shows a geometry of parallel views.

FIG. 8 shows a camera moving in a tunnel along its length.

DESCRIPTION

FIG. 1 is a diagram illustrating positions of view points (camera positions) for the system. FIG. 1 shows two planes, plane_1 100 and plane_2 110. Three (or more) view points u 102, v 104 and w 106 are positioned on plane_1 100. Similarly, plane_2 110 has three or more view points: 112, 114 and 116. They do not have to be positioned in the same way as the view points on plane_1. On each plane, the three view points should form a proper triangle (i.e., the view points should not be on the same line). A virtual camera, which may be a camera, is positioned at each of view points 102, 104, 106, 112, 114 and 116. Alternatively, instead of deploying several cameras in parallel, one camera may be positioned at each of view points 102, 104, 106, 112, 114 and 116, respectively, to take pictures at each view point sequentially.

With reference to FIGS. 1 and 5, each camera points exactly upward. Further, each camera may be a real or a virtual camera. A virtual camera generates an image that looks as if generated by a real camera. A virtual camera may be an artist rendering a scene or a computer image generator, among others. The computer image generator may generate images by transforming a plurality of images into a new image, or may synthesize an image from 3D model data.

The user specifies a new view point 120. Orthogonal projections from the point 120 onto plane_1 100 and plane_2 110 result in view point p 108 and point 118 respectively on plane_1 100 and plane_2 110, respectively. With these defined, the process for generating a view of a three-dimensional scene using multi-image morphing is described next.

Turning now to FIG. 2, a process 200 for generating a new view of a three-dimensional scene first retrieves as input the three images taken from plane_1 100 and the three images taken from plane_2 110 (step 202). These images are taken by one or more cameras mounted at points 102, 104 and 106 of plane_1 100 and points 112, 114 and 116 of plane_2 110, and directed perpendicular to the planes 100 and 110. Additionally, the user specifies the position of the point P (point 120 of FIG. 1) to the process 200 (step 204). Next, the process 200 finds correspondences among the six (or more) pictures in step 206, as discussed below. These correspondences or meshes may be user specified, or may be computer generated. One way of generating correspondences is by taking a movie by moving the camera parallel to itself and extracting the frame-to-frame correspondence by an optical flow method. Three of the frames are used as the three input views. The optical flow method generates n−1 correspondence mappings $W_2 \ldots W_n$ from the first frame to each other frame, possibly represented as meshes. The optical flow method is discussed in more detail in B. Horn, "Robot Vision" MIT Press, Cambridge, Mass. (1986) pp. 278–298, hereby incorporated by reference.

The process 200 then expresses the projection point 108 in terms of the positions of view points 102, 104 and 106 on plane_1 100 (step 208). This is done by solving the following linear system of equations:

$$\begin{vmatrix} a_1 u_x + a_2 v_x + a_3 w_x = p_x \\ a_1 u_y + a_2 v_y + a_3 w_y = p_y \\ a_1 \phantom{u_y} + a_2 \phantom{v_y} + a_3 \phantom{w_y} = 1 \end{vmatrix} \qquad \text{Eq. 1}$$

for the coefficients $a_1$, $a_2$ and $a_3$. Subscripts x and y denote the x and y components. The last equation is required by the approach to multi-image morphing, which is described later.

When view points u,v,w form a triangle (not all on the same line), it can be shown that $$\det \begin{pmatrix} u_x & v_x & w_x \\ u_y & v_y & w_y \\ 1 & 1 & 1 \end{pmatrix} \neq 0$$

Because the determinant is not zero, the solution of Eq. 1 exists and is unique.

The process 200 then builds the view from point p 108, or view_1, (step 210) using a three-image morphing process with coefficients $a_1$, $a_2$ and $a_3$ determined in step 208. Multi-image morphing produces higher quality results than warping a single image because at each point it interpolates among colors of all images instead of sampling the texture from just one image which may have noise or other defects. Also, besides this averaging, multi-image morphing serves as a good approximation for representing the effects of specular reflectivity. The multi-image morphing process is discussed in more detail in reference to FIG. 3. The use of the three-image morphing process for generating realistic views is discussed in the appendix. Also, view morphing and depth morphing are compared.

Using the mesh from step 210, the process 200 finds in it a mesh point M of the center of the image in view_1 and its corresponding points across all remaining meshes (step 212). Next, in step 214, the process 200 expresses the central point of the image in view_2 in terms of the three mesh points corresponding to M on views 112, 114, 116. This is done using the system of equations (1) where u, v and w are replaced by the three mesh points, and p is replaced by the center of the image in view_2.

The process 200 then builds view_2 using the three-image morphing process with the coefficients $a_1$, $a_2$ and $a_3$ determined in step 214 (step 216).

Further, the process 200 uses view_1 and view_2 and their corresponding meshes in a depth morphing process to produce a view from the point p 120 (step 218) before exiting (step 220).

Referring now to FIG. 3, one implementation of a multi-image morphing process 230 is shown. This is a method for converting any 2-image morphing computer program, that internally uses meshes, into a multi-image morphing program. In mesh warping, the warping functions $W_i$ are approximated by pairs of meshes.

In multi-image warping, a picture is expressed as a function f which assigns a color to each pixel in the uv space (coordinates u, v). Using a warping function W that maps (u,v) onto (x,y), the picture is warped into a second picture with coordinates x, y in the xy space. The second picture is produced by assigning a color to each pixel in the xy space by applying $W^{-1}$ and then the function f. Thus, given n warping transformations $W_1, \ldots W_n$ from uv space to xy space and one picture f on the uv space, an inverse mapping $(a_1 W_1 + a_2 W_2 + a_3 W_3 + \ldots)^{-1}$ is applied to (x,y) and then f is applied. This process is called multi-image warping because $W_i$ are assumed to be derived from or associated with correspondences between n images, although only one of these images is used for the color of the final warp.

In order to do an n-image warp given n pictures, the user builds n meshes (step 232). A program may provide an appropriate user interface to simplify the mesh construction process or make it almost automatic. The result of the mesh building process is control points in the first picture and their corresponding control points across all n pictures. For a given control point on picture 1 and corresponding points on pictures 2 through n, a new point which is a linear combination of all points is generated (points are treated as vectors). The entire process is then repeated for all control points. The result is a mesh that is a "weighted average" of n meshes with weights $a_1, a_2, \ldots, a_n$ (step 234). The weighted average mesh together with the mesh associated with the first picture are used to do the warping in step 240. W is typically approximated using a mesh correspondence approach. A number of transforms may be used. A good description can be found in G. Wolberg, "Digital Image Warping", IEEE Computer Society Press, Los Alamitos, Calif. (1990). In general, they take as input an image in a quadrilateral on one picture and produce a deformed image which is fit to the corresponding quadrilateral on the other picture. The quadrilateral warping methods may include bilinear warping, bicubic warping and perspective warping, among others. They all use data from the meshes (corners of source and destination quadrilaterals) as input parameters.

Concurrently, in step 236, the 2-image warping process generated by mesh 1 and mesh i is applied to pictures i=1 . . . n to generate n warped images from picture 1 onto picture 1, from picture 2 onto picture 1, . . . , and from picture n onto picture 1. The color of the corresponding pixels of the n pictures are blended together using coefficients (weights) $a_1, a_2, \ldots, a_n$ in step 238.

The 2-image warping process is then used with the following inputs: the intermediate picture created by step 238, the original mesh on picture 1, and the "weighted average" mesh, to generate the multi-image morph (step 240). Here, picture 1 may be any of the input images and typically, the image producing best results is used as picture 1.

The selection of the coefficients $a_1, \ldots, a_n$ is described next. If the input images are such that at least one point remains the same across all of them, then, it is natural to expect that this point or points do not move in the morph. This is achieved by imposing the constraint $a_1+a_2+ \ldots +a_n=1$. Also, there are other reasons for imposing the constraint.

The above constraint guarantees that if the initial pictures are significantly different, the morph never collapses into a point or expands to infinity. Also, this condition increases the stability of the morph.

The imposition of the above constraint is driven by the requirement that image points have to be treated as points of an affine space and not as points of a vector space. This is so because, in the image plane, a priori there is no special zero point, and all points have to be treated equally. In the affine space, linear combinations have to be replaced by affine combinations, which is equivalent to imposing the constraint.

Any point in the new n–1 dimensional affine space defined by the warping functions or meshes and the above constraint represents a picture (morph) in a space referred to as morph space. Any curve in morph space represents a sequence of pictures, or a movie. The multi-image morphing process is described in more detail in a copending application, filed by Todor Georgiev on Apr. 17, 1998 and entitled "MULTI-IMAGE MORPHING", hereby incorporated by reference. Further, the mathematics behind the multi-image morphing process is discussed in more detail in Todor Georgiev's Thesis entitled "Morphing Between Multiple Images: Theory and Applications," Jun. 1997, available from the Department of Computer Science in the Graduate School, Southern Illinois University at Carbondale, also hereby incorporated by reference.

Turning now to FIG. 4, a cylinder 280 which wraps around a camera is shown. The cylinder 280 has a radius R 282. The image plane 284 of the camera is positioned perpendicularly to the axis of the cylinder. The distance from the image plane 284 to the center of projection 293 is the camera's focal length F 294.

A real world point 286 is shown outside of the cylinder 280 and is offset from the axis of the cylinder 280 by a distance (depth) z 288. A line 289 projecting from the point 286 to the image plane 284 results in an intersection point 290 with a cylinder 280 and a point 292 with the image plane. The point 290 and point 292 are the images of the point 286 onto the cylinder 280 and the image plane 284.

Referring now to FIG. 5, the depth morphing process of step 218 is shown in more detail. In FIG. 4, two (or more, as discussed below) cameras are positioned on the line of their (common) viewing direction (step 252). Pictures are taken by each of these cameras (step 254). The pictures obtained in step 254 are projected onto a cylinder whose axis is the line of the viewing direction (step 256). The cylinder and its relationship to a camera are described in FIG. 4. Next, a multi-image morph, in this case a two-image morph, is performed between the two images on the cylinder (step 258). The coefficients are $$a_1 = \frac{B}{A+B}, a_2 = \frac{A}{A+B}$$

where A and B are distances from point 120 to plane 1 and 2 respectively. The image resulting from the two-image morph of step 258 is projected back to the image plane (step 260) before exiting.

The three steps in depth morphing can be combined into one step, making the process faster and improving the quality. However, this requires that the correspondence be set up in a particular manner. Pairs of correspondence points have to lie on a radial line starting from the center of the image.

A point is defined in a polar coordinate system by radius r and an angle. If $r_1$ is a point in the source image and $r_2$ is the corresponding point in the destination image, the position of the interpolated point may be expressed as:

$$r = \frac{1}{\frac{1-t}{r_1} + \frac{t}{r_2}}$$

where $$t = \frac{A}{A+B}$$

The angle is the same for all three points. The above formula provides the output mesh for depth morphing.

The cylinder 280 wraps around the camera and they together move parallel to its axis. The nonlinear projection from the image plane onto the cylinder 280 compensates exactly for the nonlinearity of the projection of the world onto the image plane, thus making morphing among images on the cylinder 280 a rigorous procedure for synthesizing virtual singular views by morphing. The depth morphing process associated with the cylinder 280 of FIG. 4 is discussed in more detail in the appendix.

The processes of FIGS. 2 and 5 are simplified in two aspects. First, both processes do not properly hide objects visible from one point of view when not visible from another point of view. Second, they work with the minimal number of input images, respectively six and two input images. The small number of input images may be insufficient to produce high quality renderings of scenes in certain cases. The solutions to these two issues are discussed next.

The hiding of objects invisible form the new point of view is done using information about the depth z of the points for which the output mesh overlaps with itself so that ambiguity exists. Only point with the smallest z value are painted. The value of z is not calculated explicitly. Instead, meshes from two consecutive frames of the "fly-through" move are compared. The displacement of each of the ambiguous mesh points from one frame to another is calculated. Only points with the largest displacement are displayed. This is equivalent to displaying points with the smallest z since displacement is proportional to 1/z. The process for hiding objects thus handles correctly objects that are not visible. This process is also discussed below with respect to the handling of points in a shadow.

The small number of input images may be a limitation with respect to the scenes that can be represented. In certain instances involving objects not seen by some of the cameras, using only three images may not correctly represent certain areas. Thus, if a given point is not visible from all three view points, additional view points are needed until all areas are well represented. This requirement extends the process to more than three images on each plane. Thus, the choice of the number of images and coefficients is specific to each scene. The multi-image morphing process is well-suited to handle any number of images. The multi-image morphing approach to the process of FIG. 2 may also be applied to the depth morphing process of FIG. 5. It requires three or more view points on each plane and multiple planes.

The new view generated corresponds to a virtual camera which points directly upward. When a view from an angle is desired, reprojection, such as that used in QuickTime-VR (available from Apple Computers, Inc.) and other applications, may be used to generate angled views rather than the straight upward view.

The above processes may be used to generate realistic 3D lighting and shading effects. Only multi-image warping is performed and the result of the warping operation does not have to be displayed. Only the detailed meshes/warping functions are used. The change in surface area of each small mesh quadrilateral associated with a particular pixel is determined using the mesh describing the view from the old light source and the mesh associated with the view from the new light source. The ratio of the surface areas provides the ratio of illumination for the point. The brightness of that point is then changed accordingly. Thus, if in a certain area, the mesh associated with the new light source increases in size, then the brightness of that area in the resulting view is also increased.

The mesh is also tested for overlaps in relation to the "hiding" of object process, as discussed above. If it is detected that a point is not visible from the new light source, then this point is a part of a shadow and the illumination ratio is set to a predetermined small value.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

FIG. 6 illustrates one such computer system 600, including a CPU 610, a RAM 620, a ROM 622 and an I/O controller 630 coupled by a CPU bus 640. The I/O controller 630 is also coupled by an I/O bus 698 to input devices such as a keyboard 660 and a mouse 670, and output devices such as a monitor 680. The I/O controller 630 also drives an I/O interface 690 which in turn controls a removable disk drive 692 such as a floppy disk, among others.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner. Any of the foregoing may be supplemented by, or incorporated in, Application Specific Integrated Circuits (ASICs).

While the invention has been shown and described with reference to an embodiment thereof, those skilled in the art will understand that the above and other changes in form and detail may be made without departing from the spirit and scope of the following claims.

APPENDIX

Comparison of View Morphing and Depth Morphing (1) First we explain why morphing among three parallel views produces correct results: Let's move the world and keep the camera still, instead of moving the camera and keeping the world still. If an object moves a distance a in direction parallel to the viewing plane, its image would move a distance b. Using similar triangles we see in FIG. 7 that $$b = f a / z \qquad (1)$$

where $f$ is the focal length of the camera and z is the "depth" to the point.

The image of each point moves with speed proportional to 1/z where z is the depth of that point. When a point moves parallel to the image plane with constant speed, then the speed of the image point doesn't change because the value of z is constant. This is what we need in order to achieve realistic intermediate images with view morphing.

Morphing is a linear process, in other words the interpolation between the position of the source and destination point is done in a linear way. Changing the morph parameter at constant speed produces motion of a each point at a constant speed (different for different points). We have exactly that behavior of the image points in the setting described above. That's why view morphing produces correct results.

We need at least three views if we want to be able to represent any point on the image plane. With two views a real world point is projected onto two points and by interpolation we can represent only points on the line connecting these two points. In the case of 3 views, a real world point is projected onto 3 different points on the image plane and if they form a triangle, any other point on the plane can be represented as an affine combination of these 3 vectors. (The vectors are starting from the center of projection and ending each at it's point on the image plane.) More than tree views can also be used.

(2) For the purpose of achieving complete Image-Based 3D Graphics we will need to avoid the nonlinearity problem in the special case when the camera moves "in depth", parallel to its view direction. These views are called singular. It is well known that in the case of singular views morphing does not produce correct results (realistic views) because of that nonlinearity and the linear nature of morphing. We will find a transformation from the image plane to a cylinder which can be used to avoid it, and is in effect a special case of nonlinear morphing.

Imagine the camera is "wrapped in a cylinder" and moves at constant speed parallel to its length. Or, which is equivalent, the world moves with respect to a still camera in a cylinder. How would the image of a world point move after we project it from the image plane onto the surface of the cylinder ? We will show that the speed of the projection on the cylinder is constant. This is "a cure" for the above problem. We will show that the nonlinear projection onto a cylinder exactly compensates for the nonlinearity of the projection onto the image plane, thus making morphing among images on the cylinder a rigorous procedure for synthesizing, virtual singular views by morphing.

FIG. 8 shows a camera moving in a tunnel along its length. The camera is looking up.

From FIG. 8 we can see, using similar triangles, that $$h = fR/r \quad (2)$$

where $f$ is the focal length of the camera, R is the radius of the cylinder, h describes the position of the point on the wall of the cylinder, r describes the position of its image on the image plane. The transformation between h and r is nonlinear.

Using (2) we map the whole image plane onto a cylinder. Then morph between images on the cylinder, and in the end map the new image back to the plane. In order to show that this avoids the nonlinearity problem we just have to notice that the geometry of FIG. B is the same as in FIG. A and so we can make the same conclusions. Instead of formula (1), now we have b=R a/z.

If a world point moves in vertical direction at a constant speed, then its image on the cylinder will move at a constant speed too (even though the image on the image plane does not move at a constant speed). This is what we need for correct view morphing.

What is claimed is:

1. A computer-implemented method for generating a new view of a three-dimensional scene, comprising:
   receiving three or more pictures representing three or more different view points on a plane, each picture taken from a viewing direction perpendicular to the plane;
   selecting a new point on the plane;
   generating the new view of the three dimensional scene from the new point by morphing among the three or more pictures; and
   determining a set of coefficients based on the new point;
   wherein the molphing uses n−1 warping function, where n is the number of pictures, and wherein the view generating step includes
      generating correspondences between n−1 pairs of pictures,
      generating a weighted average correspondence mapping,
      selecting a picture from the three or more pictures,
      applying a two-image warp of each of the remaining pictures into the selected picture to generate n−1 intermediate pictures,
      generating a blended picture by blending the n−1 intermediate pictures with the selected picture, and
      generating the new view using the weighted average correspondence mapping and the blended picture.

2. The method of claim 1, further comprising taking the picture using a virtual camera.

3. The method of claim 2, wherein the virtual camera is a camera or a computer image generator.

4. The method of claim 1, further comprising generating a movie by generating a sequence of views from a sequence of new points.

5. The method of claim 1, wherein the set of coefficients sum up to one.

6. The method of claim 5, wherein the set of coefficients are functions on the image plane.

7. The method of claim 1, wherein one virtual camera is positioned at each view point.

8. The method of claim 1, wherein all images are taken by one virtual camera sequentially from each view point.

9. A method for generating a new view of a three dimensional scene, comprising:
   receiving two or more pictures from two or more view points located on a line along the direction of view;
   projecting the two or more pictures onto a cylinder;
   performing a multi-image morph on the images projected on the cylinder;
   projecting the result of the multi-image morph to generate the new view of the three dimensional scene; and
   determining a set of coefficients based on the new point;
   wherein the morphing uses n−1 warping functions, where n is the number of pictures, and wherein the view generating step includes
      generating correspondences between n−1 pairs of pictures,
      generating a weighted average correspondence mapping,
      selecting a picture from the three or more pictures,
      applying a two-image warp of each of the remaining pictures into the selected picture to generate n−1 intermediate pictures,
      generating a blended picture by blending the n−1 intermediate pictures with the selected picture, and
      generating the new view using the weighted average correspondence mapping and the blended picture.

10. The method of claim 9, further comprising taking the picture using a virtual camera.

11. The method of claim 10, wherein the virtual camera is a camera or a computer image generator.

12. The method of claim 9, further comprising generating a movie by generating a sequence of views from a sequence of new points.

13. The method of claim 11, wherein the set of coefficients sum up to one.

14. The method of claim 13, wherein the set of coefficients are functions on the image plane.

15. The method of claim 9, wherein one virtual camera is positioned at each view point.

16. The method of claim 9, wherein all images are taken by one virtual camera sequentially from each view point.

17. A computer-implemented method for generating a new view of a three dimensional scene, comprising:

receiving three or more images representing three or more different view points on a first plane, each image taken from a viewing direction perpendicular to the first plane;

receiving three or more images from three or more different view points on a second plane, each image taken from a viewing direction perpendicular to the second plane, the first plane being parallel to the second plane;

generating the new view of the three dimensional scene from an arbitrary point in three dimensional space by morphing among the six or more images;and determining a set of coefficients based on the new point;
    wherein the morphing uses n-1 warping functions, where n is the number of pictures, and wherein the view generating step includes
      generating correspondences between n-1 pairs of pictures,
      generating a weighted average correspondence mapping,
      selecting a picture from the three or more pictures,
      applying a two-image warp of each of the remaining pictures into the selected picture to generate n-1 intermediate pictures,
      generating a blended picture by blending the n-1 intermediate pictures with the selected picture, and
      generating the new view using the weighted average correspondence mapping and the blended picture.

18. The method of claim 17, further comprising taking the picture using a virtual camera.

19. The method of claim 18, wherein the virtual camera is a camera or a computer image generator.

20. The method of claim 17, further comprising generating a movie by generating a sequence of views from a sequence of new points.

21. The method of claim 17, wherein the set of coefficients sum up to one.

22. The method of claim 21, wherein the set of coefficients are functions on the image plane.

23. The method of claim 17, wherein one virtual camera is positioned at each view point.

24. The method of claim 17, wherein all images are taken by one virtual camera sequentially from each view point.

25. A method for changing the lighting of a view of a three dimensional scene from a first light source to a second light source, comprising:

determining a mesh associated with the view of the three dimensional scene from the first light source;

determining a mesh associated with the view of the three dimensional scene from the second light source;

determining the amount of light based on the ratio of the areas of pairs of corresponding quadrilaterals in the meshes; and generating the new view of the three dimensional scene with the determined light.

26. The method of claim 25, further comprising taking the picture using a virtual camera.

27. The method of claim 26, wherein the virtual camera is a camera or a computer image generator.

28. The method of claim 25, further comprising generating a movie by generating a sequence of views from a sequence of new points.

29. The method of claim 25, further comprising determining a set of coefficients based on points of the first and second light sources.

30. The method of claim 29, wherein the morphing uses n-1 warping functions, where n is the number of pictures, and wherein the view generating step further comprises:

generating correspondences between n-1 pairs of pictures; and generating a weighted average correspondence mapping.

31. The method of claim 29, wherein the set of coefficients sum up to one.

32. The method of claim 31, wherein the set of coefficients are functions on the image plane.

33. The method of claim 25, wherein one virtual camera is positioned at each view point.

34. The method of claim 25, wherein all images are taken by one virtual camera sequentially from each view point.

35. A computer-implemented method for generating a new view of a three dimensional scene, comprising:

receiving three or more images representing three or more different view points on a first plane, each image taken from a viewing direction perpendicular to the first plane;

receiving three or more images from three or more different view points on a second plane, each image taken from a viewing direction perpendicular to the second plane, the first plane being parallel to the second plane; and generating the new view of the three dimensional scene from an arbitrary point in three dimensional space by morphing among the six or more images, each morphing operation including:
    determining a set of coefficients based on the new point;
    generating one or more correspondences between n-1 pairs of pictures;
    generating a weighted average correspondence mapping;
    selecting a picture from the three or more pictures;
    applying a two-image warp of each of the remaining pictures into the selected picture to generate n-1 intermediate pictures;
    generating a blended picture by blending the n-1 intermediate pictures with the selected picture; and
    generating the new view using the weighted average correspondence mapping and the blended picture.

* * * * *

UNITED STATES PATENT AND TRADEMARK OFFICE
CERTIFICATE OF CORRECTION

PATENT NO.    : 6,268,846 B1  
DATED         : July 31, 2001  
INVENTOR(S)   : Todor T. Georgiev Page 1 of 1

It is certified that error appears in the above-identified patent and that said Letters Patent is hereby corrected as shown below:

Column 10,
Line 6, please replace "molphing" with -- morphing --; and please replace "function," with -- functions, --.
Line 20, after "blended picture", please add -- , wherein n is greater than or equal to 2. --.
Line 61, after "blended picture", please add -- , wherein n is greater than or equal to 2. --.

Column 11,
Line 38, after "blended picture", please add -- , wherein n is greater than or equal to 2. --.

Signed and Sealed this

Sixteenth Day of April, 2002

Attest:

Attesting Officer

JAMES E. ROGAN
Director of the United States Patent and Trademark Office